United States Patent [19]

Spiller

[11] Patent Number: 5,057,994
[45] Date of Patent: Oct. 15, 1991

[54] CONTROL SYSTEM FOR INDUSTRIAL PLANT

[75] Inventor: Christopher R. L. Spiller, Derby, England

[73] Assignee: Rolls-Royce and Associates Limited, Derby, England

[21] Appl. No.: 370,796

[22] Filed: Jun. 23, 1989

[30] Foreign Application Priority Data

Jul. 4, 1988 [GB] United Kingdom ................ 8815897

[51] Int. Cl.$^5$ ............................................. G06F 11/16
[52] U.S. Cl. .................................... 364/184; 364/133; 364/186; 371/68.3
[58] Field of Search ...................... 364/133, 186, 184; 371/68.3, 36, 68.2, 34

[56] References Cited

U.S. PATENT DOCUMENTS

| | | | |
|---|---|---|---|
| 3,639,778 | 2/1972 | Cereghino et al. | 371/68.1 |
| 3,805,234 | 4/1974 | Masters | 371/34 |
| 3,863,215 | 1/1975 | McGrogan, Jr. | 371/36 |
| 4,101,958 | 7/1978 | Patterson et al. | 371/68.3 |
| 4,198,678 | 4/1980 | Maatje et al. | 364/133 |
| 4,327,437 | 4/1982 | Gelderloos | 371/68.3 |
| 4,409,635 | 10/1983 | Kraus | 364/186 |
| 4,422,140 | 12/1983 | Keats | 364/186 |
| 4,447,903 | 5/1984 | Sewerinson | 371/68.2 |
| 4,497,059 | 1/1985 | Smith | 371/68.2 |
| 4,520,482 | 5/1985 | Fourré et al. | 371/68.3 |

Primary Examiner—Jerry Smith
Assistant Examiner—Patrick Muir
Attorney, Agent, or Firm—Cushman, Darby & Cushman

[57] ABSTRACT

A control system for an industrial plant comprises a plurality of instrument sets and a plurality of logic sets.

The instrument sets have a number of sensors which detect parameters of the industrial plant, and have two serial link controllers which supply the output signals from each sensor in the instrument set sequentilly to the logic sets.

The logic sets have a number of auto select logic circuits, each of which selects data from the sensors from one of the instrument sets, and a synchroniser ensures that the output signals from the sensors detecting the same parameter are supplied to a voting logic circuit at the same time. The voting logic circuit performs a voting function on the output signals to produce a series of high reliability signals which are converted to parallel high reliability signals by a series to a parallel converter. The high reliability signals are supplied to a fault logic shutdown circuit which controls the operation of shutdown mechanisms for the industrial plant.

15 Claims, 4 Drawing Sheets

Fig. 4.

| | | | | | | | | |
|---|---|---|---|---|---|---|---|---|
| INSTRUMENT SET 1 TEST BITS | 0 | 0 | 0 | 1 | 0 | 1 | 1 | 1 |
| INSTRUMENT SET 2 TEST BITS | 0 | 1 | 0 | 1 | 1 | 0 | 0 | 1 |
| INSTRUMENT SET 3 TEST BITS | 0 | 1 | 1 | 0 | 0 | 1 | 0 | 1 |
| VOTING UNIT OUTPUT | 0 | 1 | 0 | 1 | 0 | 1 | 0 | 1 |

VOTING UNIT SEES THE COMBINATIONS 000. 011. 001. ...... 111 IN SEQUENCE. AND SHOULD PRODUCE THE OUTPUT SHOWN.

CONTROL SYSTEM FOR INDUSTRIAL PLANT

BACKGROUND OF THE INVENTION

1. Field of the Invention

The present invention relates to control systems for industrial plants.

2. Background of the Invention

There is often a requirement in industrial plants for a control system which will shutdown the industrial plant, should the industrial plant operate outside a predetermined operating condition regime.

A known control system which will shutdown the industrial plant, should the industrial plant operate outside a predetermined operating regime, comprises a plurality of sensors which detect parameters of the industrial plant and which send output signals to a logic circuit which analyzes the output signals to determine if the industrial plant is operating outside the predetermined operating regime. If the logic circuit determines that the industrial plant is operating outside the predetermined operating regime, a shutdown signal is produced which is sent to some means for shutting down the industrial plant.

However, the consequences of a failure to shutdown the industrial plant when required, i.e. when the industrial plant is operating outside the predetermined operating regime, are very severe especially in some chemical plants or nuclear reactor power plants. This known control system is inadequate since a failure of any part of the control system may allow the industrial plant to continue operating when shutdown is required.

To overcome the problem of failure of any part of the control system described, on improved control system comprising a number of sets of sensors, a number of logic circuits, and a voting logic circuit have been devised. In this control system; each set of sensors sends its output signals to one of the logic circuits, which analyzes the output signals to determine if the industrial plant is operating outside the predetermined operating regime. Each logic circuit sends a signal to the voting logic circuit. The voting logic circuit performs a function on the signals received from the logic circuits to produce a high reliability shutdown signal. If any of the sensors, or logic circuits fail, the remaining sensors in other sets and logic circuits ensure that shutdown signals are sent to the voting logic circuit by some of the logic circuits.

However, the voting logic circuits are susceptible to failure, and in some industrial plants the failure probability of the voting logic circuit is still too high in terms of the probability of failure to shut down when required.

A further control system to overcome the problem of failure of the voting logic circuit, has used a number of voting logic circuits each of which receive the output signals from all the logic circuits. In this control system each voting logic circuit operates independent means for shutting down the industrial plant.

Such a control system provides an effective system with considerably reduced probability of failure to shut down the industrial plant when required. However, this control system uses a relatively large number of voting logic circuits and a relatively large number of connections, which makes the control system relatively bulky, relatively complex and relatively expensive.

SUMMARY OF THE INVENTION

The present invention seeks to provide a control system for an industrial plant which will shutdown the industrial plant, should the industrial plant operate outside a predetermined operating condition regime, with relatively low probability of failure and in which the control system is of reduced bulk, relatively simple and relatively cheap.

Accordingly; the present invention provides a control system for an industrial plant comprising a plurality of instrument sets and a plurality of logic sets, each instrument set comprising a plurality of sensors to detect parameters of the industrial plant, each instrument set comprising a plurality of serial link controllers, each sensor being arranged to supply an output signal to each of the plurality of serial link controllers, each logic set comprising a plurality of auto select logic circuits, a synchronizer, a voting logic circuit, a serial-to-parallel converter and a control logic circuit, each of the plurality of serial link controllers in each instrument set being arranged to supply the output signals from each of the sensors in the instrument set sequentially to one of the auto select logic circuits in each of the logic sets serially via respective transmission lines, each of the auto select logic circuits in each logic set being arranged to select data from the plurality of sensors from one of the instrument sets and being arranged to supply the data to the synchronizer, the synchronizer of each logic set being arranged to supply the data from each of the auto select logic circuits to the voting logic circuit of the logic set such that the output signals from the sensors in each instrument set detecting the same parameter are supplied to the voting logic circuit at substantially the same time, each voting logic circuit being arranged to perform a voting function on the output signals from the sensors in all the instrument sets detecting the same parameter to produce a series of single high reliability signals which are arranged to be supplied to the series-to-parallel converter of the logic set, each series-to-parallel converter being arranged to convert the series of high reliability signals to parallel high reliability signals which are supplied to the control logic circuit of the logic set, each control logic circuit being arranged to control the operation of an industrial plant in response to the high reliability signals.

The control logic may be a shutdown logic circuit arranged to control the operation of shutdown means for the industrial plant.

The control logic circuit may be a control algorithm processor circuit arranged to continuously control the industrial plant continuously.

At least one of the auto select logic circuits may select data from the plurality of sensors from one of the instrument sets by selecting transmission lines with serial signals.

At least one of the auto select logic circuits may select data from the plurality of sensors from one of the instrument sets by selecting an error detecting coding.

The synchronizer may comprise a first in/first out memory.

The sequential output signals may be returned to the serial link controllers via respective second transmission lines for decoding and comparing with the transmitted output signals.

Each of the serial link controllers may have a fault alarm.

Each instrument set may comprise a self testing means, the self testing means being arranged to supply test signals to each of the plurality of serial link controllers, each serial link controller being arranged to supply the test signals sequentially with the output signals from each of the sensors in the instrument set to one of the auto select logic circuits in each of the logic sets serially via transmission lines, the voting logic circuit of each logic set being arranged to perform a voting function on the test signals from the self testing means of each instrument set to produce a high reliability test signal, each logic set having a checker means to ensure that the high reliability test signals is correct.

The checker means may receive signals from the series-to-parallel converter.

Each of the checker means may have a fault alarm.

The industrial plant may be a nuclear reactor plant.

The nuclear reactor plant may be a pressurized water nuclear reactor.

Each fault shutdown logic circuit may be arranged to control the operation of a separate shutdown means.

Each fault shutdown logic circuit may be arranged to control the operation of a single control rod or a group of control rods.

BRIEF DESCRIPTION OF THE DRAWINGS

The present invention will be more fully described by way of example, with reference to the accompanying drawings, in which:

FIG. 4 is a table illustrating test vectors for a two out of three voting.

DETAILED DESCRIPTION OF THE PREFERRED EMBODIMENT

Figure 1:
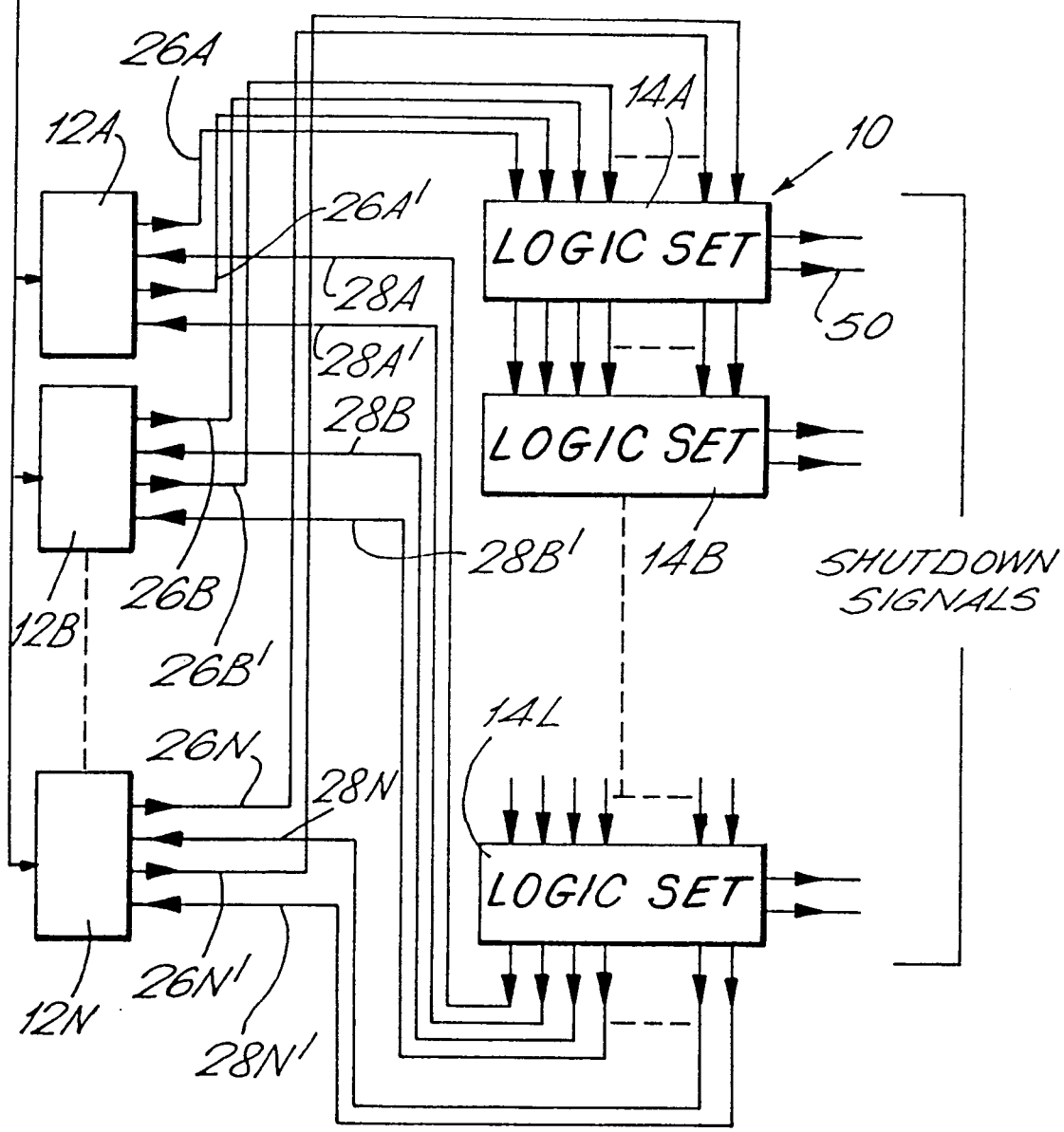
FIG. 1 is a schematic diagram of a control system for an industrial plant according to the present invention.

A control system 10 for an industrial plant (not shown) is shown in FIG. 1 and comprises a plurality of instrument sets 12A, 12B to 12N and a plurality of logic sets 14A, 14B to 14L.

Figure 2:
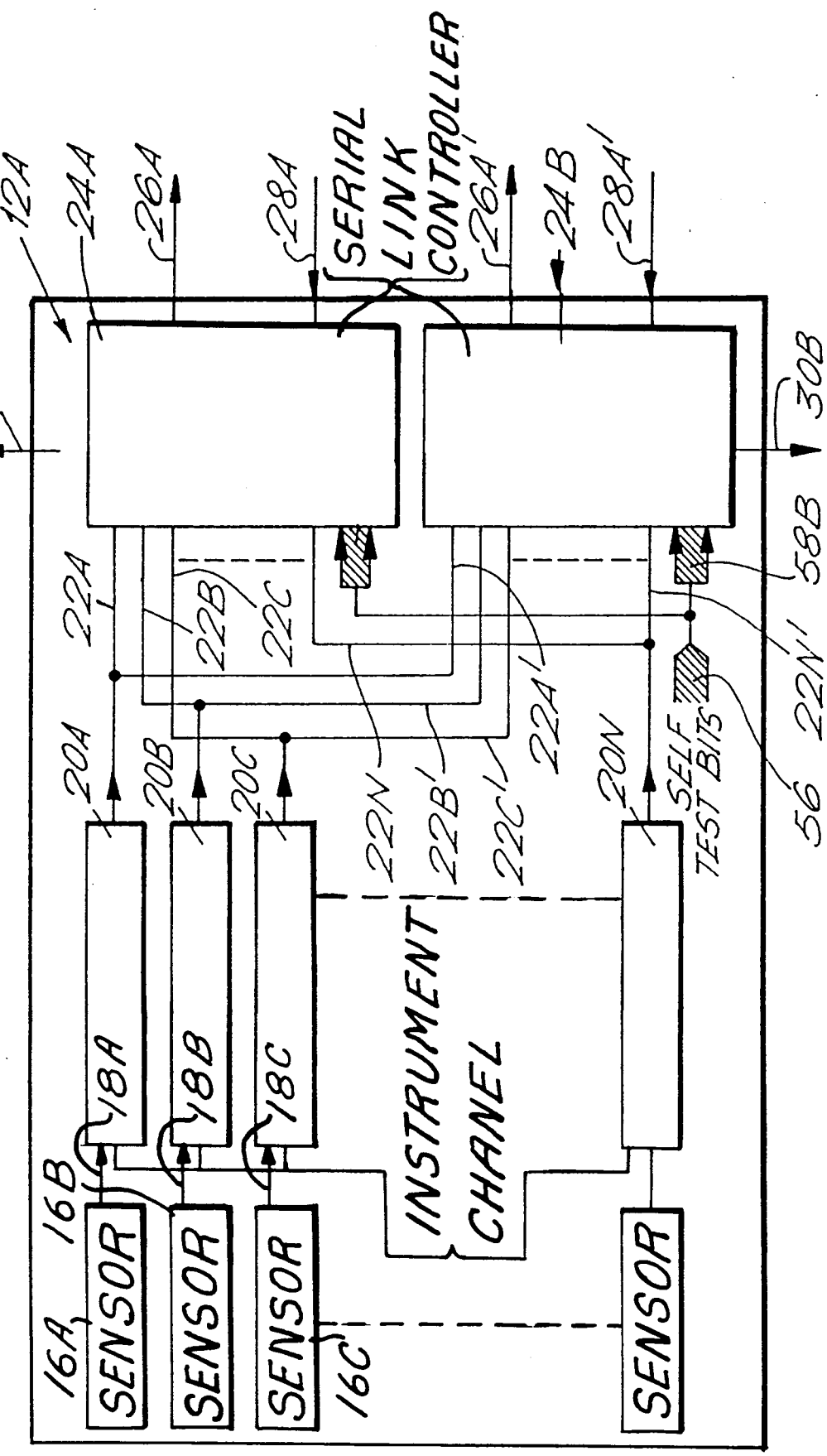
FIG. 2 is a schematic diagram of an instrument set shown in FIG. 1.

The instrument set 12A is shown schematically in more detail in FIG. 2 and comprises a plurality of sensors 16A, 16B 16C to 16N, each of which detects a parameter, or condition, of the industrial plant. The sensors may measure for example temperatures, pressures, vibrations or any other required parameters at the same locations or different locations throughout the industrial plant. Each of the sensors 16A, 16B, 16C to 16N produces an output signal, dependent upon the parameter being detected, which is arranged to be supplied to respective instrument channels 20A, 20B, 20C to 20N via electrically conduction elements 18A, 18B, 18C to 18N respectively. The instrument channels 20A, 20B, 20C to 20N process the output signals, for example amplify, filter etc. and produce trip signals. The instrument channels 20A, 20B, 20C to 20N are arranged to supply their respective output signals to a pair of serial link controllers 24A and 24B via electrically conducting elements 22A, 22B, 22C to 22N and 22A',22B',22C' to 22N' respectively. The instrument channels 20A to 20N also produce partial trip signals. Although two serial link controllers are used in the example, it may be equally possible to use more than two so as to increase the reliability of the control system. The serial link controllers 24A and 24B are arranged to transmit the output signals from each of sensors 16A, 16B, 16C to 16N serially to each of the logic sets 14A, 14B to 14L via electrically conducting elements 26A and 26A' respectively which connect the logic sets 14A to 14L in series. Electrically conducting elements 28A and 28A' return the output signals to the serial link controllers 24A and 24B for checking that the output signals received by the logic sets are in accordance with the output signals transmitted. If a discrepancy is detected the serial link controllers cease transmission, if there is a presence of serial signals these are used by the logic sets. The serial link controllers 24A and 24B are electrically connected by elements 30A and 30B to fault alarms (not shown) for the supplying of a fault alarm signal to operate the fault alarm if a discrepancy is detected by the serial link controllers 24A and 24B between the output signals transmitted, and the output signals received by the logic sets.

The instrument sets 12B, 12C to 12N are substantially the same as instrument set 12A, and the instrument sets 12B, 12C to 12N will have sensors measuring the same parameters at the same locations as instrument set 12A. However, some of the instrument sets may not have all the sensors, if the sensors measuring a particular parameter are sufficiently reliable to require fewer copies than there are instrument sets. Where a sensor is omitted, its output line is tied to a trip or non-trip state, as required to obtain the desired voting from the sensors which are present.

The serial link controllers may use any suitable protocols such as error detecting coding for example a hamming type coding scheme or cyclic redundancy check.

Figure 3:
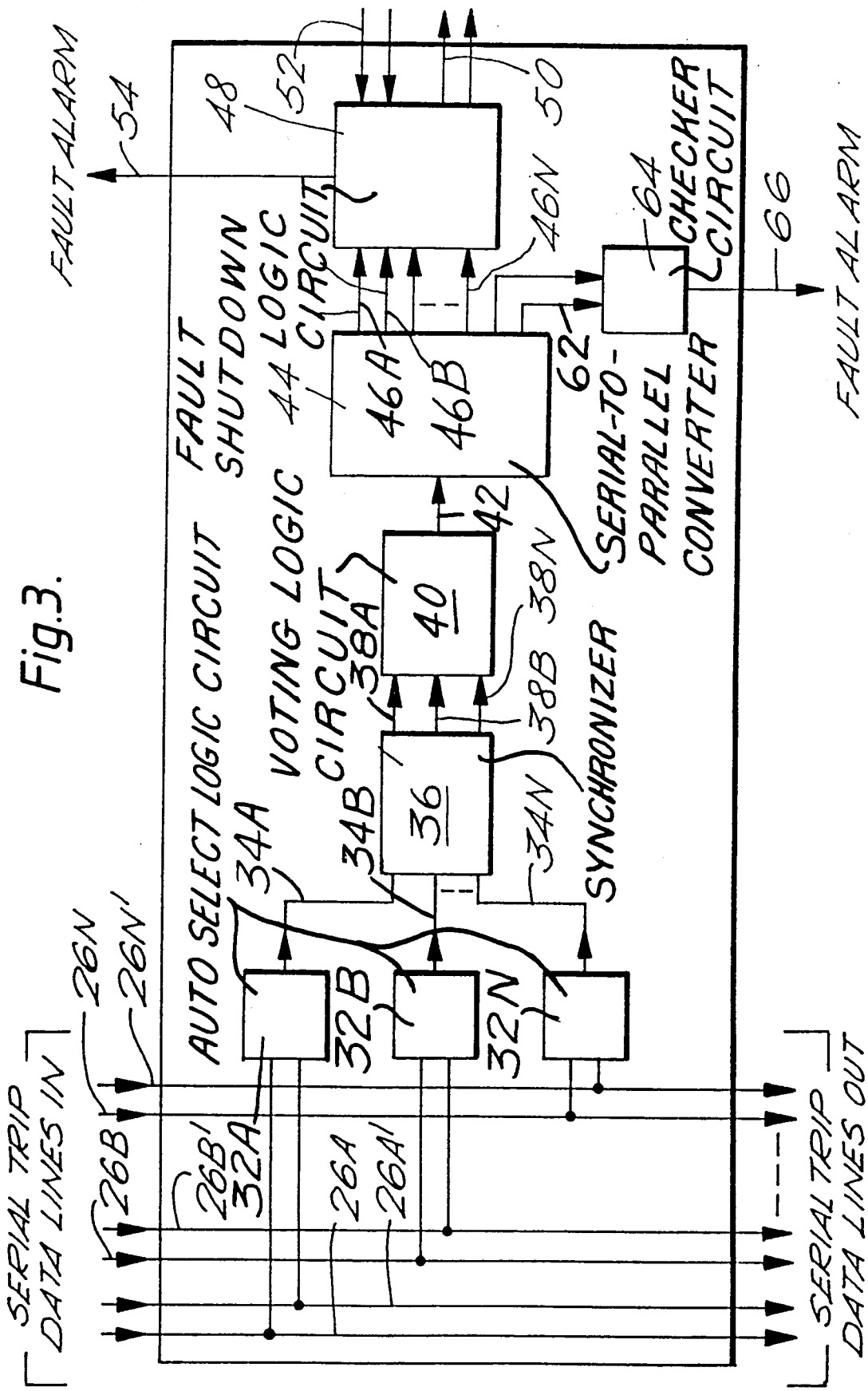
FIG. 3 is a schematic diagram of a logic set shown in FIG. 1.

The logic set 14A is shown schematically in more detail in FIG. 3 and comprises a plurality of auto select logic circuits 32A, 32B to 32N, i.e. one auto select logic circuit for each instrument set, and each of the auto select logic circuits 32A, 32B to 32N is arranged to select the output signals from all of the sensors from one of the instrument sets by selecting an electrically conducting element with serial signals/or by avoiding a conducting element not having serial signals. Therefore, for example the auto select logic circuit 32A selects the output signals from all of the sensors 16A, 16B, 16C to 16N from instrument set 12A from conducting element 26A or 26A'. Similarly auto select logic circuit 32B selects the output signals from all of the sensors from instrument set 12B from conducting element 26B or 26B'. Likewise auto select logic circuits 32C to 32N select the output signals from all the sensors in sets 12C to 12N.

If hamming type coding scheme is used, a code checker is used in the selection logic.

The auto select logic circuits 32A to 32N are arranged to supply data, i.e. the selected output signals, to the synchronizer 36, and the synchronizer 36 ensures that the output signals from the sensor in each instrument set detecting the same parameter are supplied to the voting logic circuit 40 at substantially the same time via electrically conducting elements 38A to 38N respectively. The synchronizer 36 may comprise a first in/first out memory.

The voting logic circuit 40 is arranged to perform a voting function on the output signals from the sensors in all the instrument sets detecting the same parameter, and the voting function is performed for the output signals from the sensors in all the instrument sets for all the parameters in sequence to produce a single serial high reliability signal. The single serial high reliability signal is supplied to a series-to-parallel converter 44 via an electrically conducting element 42, the series to parallel converter 44 is arranged to convert the single serial high reliability signal to parallel high reliability signals which are supplied to a fault shutdown logic circuit 48 via electrically conducting elements 46A to 46N.

The fault shutdown logic circuit 48 is arranged to control the operating of a shutdown mechanism for the industrial plant in response to the high reliability signals by supplying shutdown output signals via elements 50.

The logic sets 14B to 14L are substantially the same and operate in substantially the same manner as instrument set 14A.

The shutdown logic is designed to give the shutdown output signals in one out of two, two out of three, two out of four, three out of four or other suitable codes. The shutdown output signals are looped back by elements 52 and checked, so as to check both the shutdown logic and the output connection elements 50. If a fault is detected by this checking a fault alarm signal is supplied to a fault alarm (not shown) by electrical connection elements 54 to operate the fault alarm to initiate maintenance. The shutdown logic circuit 48 also incorporates error detecting codes in addition to the loop back checking.

The instrument set 12A has a self test system 56 which supplies test signals to the serial link controllers 24A and 24B via electrical connector elements 58A and 58B respectively. The serial link controllers 24A, 24B supplies the test signals sequentially with the output signals from the sensors, in the instrument set, to one of the auto select logic circuits in each of the logic sets. The test signals are processed by the synchronizer, voting logic circuit and series-to-parallel converter. The logic set 14A has a checker circuit 64 which receives the test signal by electrical connector elements 62 from the series-to-parallel converter 44. The checker circuit 64 has an electrical connection element 66 which supplies a fault alarm signal to a fault alarm (not shown).

If the auto-select logic circuits base their decision on the presence of serial signals, it is necessary for the serial link controllers to cease transmission if a fault is detected.

All of the instrument sets 12B to 12N also have self test systems, and all of the logic sets 14B to 14L have checker circuits.

The self test systems in the different instrument sets are arranged to transmit different test signals so that when they arrive at the voting logic circuits they form a set of test vectors. The checker circuits check that the voting logic circuits response to the test vectors is correct after conversion to parallel form, and if it is incorrect a fault alarm signal is sent to the fault alarm to initiate maintenance. An example of test signals is shown in FIG. 4 for a two out of three voting system. The voting logic circuits should receive the combination of test signals, from the self test systems of three instrument sets of 001, 011, 001 . . . 111 in sequence and produce the outputs 0, 1, 0 . . . 1, the checker circuit checks that this is achieved.

The control system has individual parameter voting, and allows the flexibility to tailor the degree of redundancy of each individual sensor and channel. The control system incorporates self testing features which enables faults in the most sensitive area to be self announcing, this reduces the probability of system failure by reducing the fault detection time. Redundancy at individual sensor and channel rather than instrument set also reduces the probability of control system failure to produce an extremely reliable control system.

The control system has voting performed on individual parameter rather than on a guard line basis as in the prior art. A further advantage of the control system is that parameter voting is achieved with the number of logic sets being a function of the number of independent output signals required rather than of the number of parameters being measured.

The control system described is particularly suitable for use with nuclear reactor plant, for example pressurized water nuclear reactors (PWR). In such a control system the shutdown output signals from the logic sets would be supplied to separate control rods, or a small group of control rods, such that a failure of one logic set or one control rod could neither cause shutdown nor prevent shutdown, due to the limited effect of a single control rod or small group of control rods.

The control system may be used to shutdown the nuclear reactor plant using other methods.

The invention has been described by way of reference to a shutdown logic circuit, but any suitable control logic circuit may be used, for example the shutdown logic circuit may be replaced by a control algorithm processor circuit in the event that continuous control of the industrial plant is required rather than a shutdown control.

The control system is equally suitable for use with other industrial plant e.g. hazardous chemical plants.

In the control system for use with the nuclear reactor plant the output signals from the sensors are trip states, whereas in the control system for use with other industrial plant the output signals from the sensors may be levels. The voting logic circuit for other industrial plant is arranged to reject wild output signals and to produce a high reliability best estimate signal from those available.

I claim:

1. A control system for an industrial plant comprising a plurality of instrument sets and a plurality of logic sets, each instrument set comprising: a plurality of sensors to detect parameters of the industrial plant, each instrument set also comprising a plurality of serial link controllers, each sensor being arranged to supply an output signal to each of the plurality of serial link controllers, each logic set comprising: a plurality of auto select logic circuits, a synchronizer, a voting logic circuit, a serial-to-parallel converter and a control logic circuit, each of the plurality of serial link controllers in each instrument set being arranged to supply the output signals from each of the sensors in the instrument set sequentially to a respective one of the auto select logic circuits in each of the logic sets serially via respective independent transmission lines, each of the auto select logic circuits in each logic set being arranged to select data form the plurality of sensors from the respective one of the instrument sets and being arranged to supply the data to the synchronizer, each of the auto select logic circuits in each logic set being arranged to detect any of the respective independent transmission lines transmitting erroneous serial signals and being arranged to select one of the independent transmission lines not transmitting erroneous serial signals, the synchronizer of each logic set being arranged to supply the data from each of the auto select logic circuits to the voting logic circuit of the logic set such that the output signals from the sensors in each instrument set detecting the same parameter are supplied to the voting logic circuit at substantially the same time, each voting logic circuit being arranged to perform a voting function on the output signals from the sensors in all the instrument sets detecting the same parameter to produce a series of single high reliability signals which are arranged to be supplied to the serial-to-parallel converter of the logic set, each serial-to-parallel converter being arranged to convert the series of high reliability signals to parallel high reliability signals which are supplied to the control logic circuit of the logic set, each control logic circuit being arranged to control the operation of the industrial plant in response to the high reliability signals.

2. A control system as claimed in claim 1 in which the control logic circuit is a shutdown logic circuit arranged to control the operations of shutdown means for the industrial plant.

3. A control system as claimed in claim 1 in which the control logic circuit is a control algorithm processor circuit arranged to continuously control the industrial plant.

4. A control system as claimed in claim 1 in which at least one of the auto select logic circuits selects data from the plurality of sensors from one of the instrument sets by selecting transmission lines with serial signals.

5. A control system as claimed in claim 1 in which at least one of the auto select logic circuits detects erroneous serial signals using error detecting coding.

6. A control system as claimed in claim 1 in which the synchronizer comprises a first in/first out memory.

7. A control system as claimed in claim 1 in which the sequential output signals are returned to the serial link controllers via respective second transmission lines for decoding and comparing with the sequential output signals.

8. A control system as claimed in claim 7 in which each of the serial link controllers has a fault alarm.

9. A control system as claimed in claim 1 in which each instrument set comprises a self testing means for supplying test signals to each of the plurality of serial link controllers, each serial link controller being arranged to supply the test signals sequentially to one of the auto select logic circuits in each of the logic sets serially via said independent transmission lines, the voting logic circuit of each logic set being arranged to perform a voting function on the test signals from the self testing means of each instrument set to produce a high reliability test signal, each logic set having a checker means for ensuring that the high reliability test signal is correct.

10. A control system as claimed in claim 9 in which the checker means receives signals from the series-to-parallel converter.

11. A control system as claimed in claim 9 in which each of the checker means has a fault alarm.

12. A control system as claimed in claim 1 in which each control logic circuit is arranged to control the operation of a separate shutdown means.

13. A control system as claimed in claim 1 in which the industrial plant is a nuclear reactor plant.

14. A control system as claimed in claim 13 in which the nuclear reactor plant is a pressurized water nuclear reactor.

15. A control system as claimed in claim 13 in which which each control logic circuit is arranged to control the operation of a single control rod or a group of control rods.

* * * * *